United States Patent [19]

Sachs et al.

[11] Patent Number: 5,087,024
[45] Date of Patent: Feb. 11, 1992

[54] SHEET-REMOVAL DEVICE

[75] Inventors: Gunter Sachs, Ostfildern; Bernd Mirlieb, Fellbach, both of Fed. Rep. of Germany

[73] Assignee: Eastman Kodak Company, Rochester, N.Y.

[21] Appl. No.: 427,135

[22] PCT Filed: May 16, 1988

[86] PCT No.: PCT/EP88/00420

§ 371 Date: Oct. 16, 1989

§ 102(e) Date: Oct. 16, 1989

[87] PCT Pub. No.: WO88/09523

PCT Pub. Date: Dec. 1, 1988

[30] Foreign Application Priority Data

May 20, 1987 [DE] Fed. Rep. of Germany ....... 3716904

[51] Int. Cl.⁵ .................................................. B65H 5/08
[52] U.S. Cl. .................................... 271/11; 271/106; 271/107
[58] Field of Search .............. 271/9, 106, 107, 108, 271/11, 14

[56] References Cited

U.S. PATENT DOCUMENTS

| | | | |
|---|---|---|---|
| 2,185,652 | 1/1940 | Spiess | 271/106 X |
| 3,284,079 | 11/1966 | Jurny et al. | 271/106 |
| 4,218,054 | 8/1980 | Bauer et al. | 271/106 X |
| 4,354,336 | 10/1982 | Azzaroni | 271/9 X |
| 4,420,150 | 12/1983 | Umezawa | 271/108 X |
| 4,427,192 | 1/1984 | Kushmaul et al. | 271/11 |
| 4,509,736 | 4/1985 | Stahl et al. | 271/107 X |
| 4,921,237 | 5/1990 | Nubson et al. | 271/106 X |

FOREIGN PATENT DOCUMENTS

| | | | |
|---|---|---|---|
| 533474 | 9/1931 | Fed. Rep. of Germany | 271/107 |
| 702651 | 1/1941 | Fed. Rep. of Germany | 271/106 |
| 93744 | 7/1980 | Japan | 271/11 |
| 123829 | 9/1980 | Japan | 271/107 |
| 127534 | 6/1986 | Japan | 271/107 |
| 248833 | 11/1986 | Japan | 271/11 |
| 269824 | 11/1987 | Japan | 271/107 |
| 275940 | 11/1987 | Japan | 271/11 |
| 252840 | 10/1988 | Japan | 271/11 |
| 2-3126 | 1/1990 | Japan | 271/107 |
| 484018 | 4/1938 | United Kingdom | 271/107 |

Primary Examiner—Robert P. Olszewski
Assistant Examiner—Boris Milef
Attorney, Agent, or Firm—G. Herman Childress

[57] ABSTRACT

Apparatus for removing a sheet from a container such as a sheet film from a cassette, by a suction device mounted for movement rectilinearly at an angle to the plane of the sheet.

2 Claims, 7 Drawing Sheets

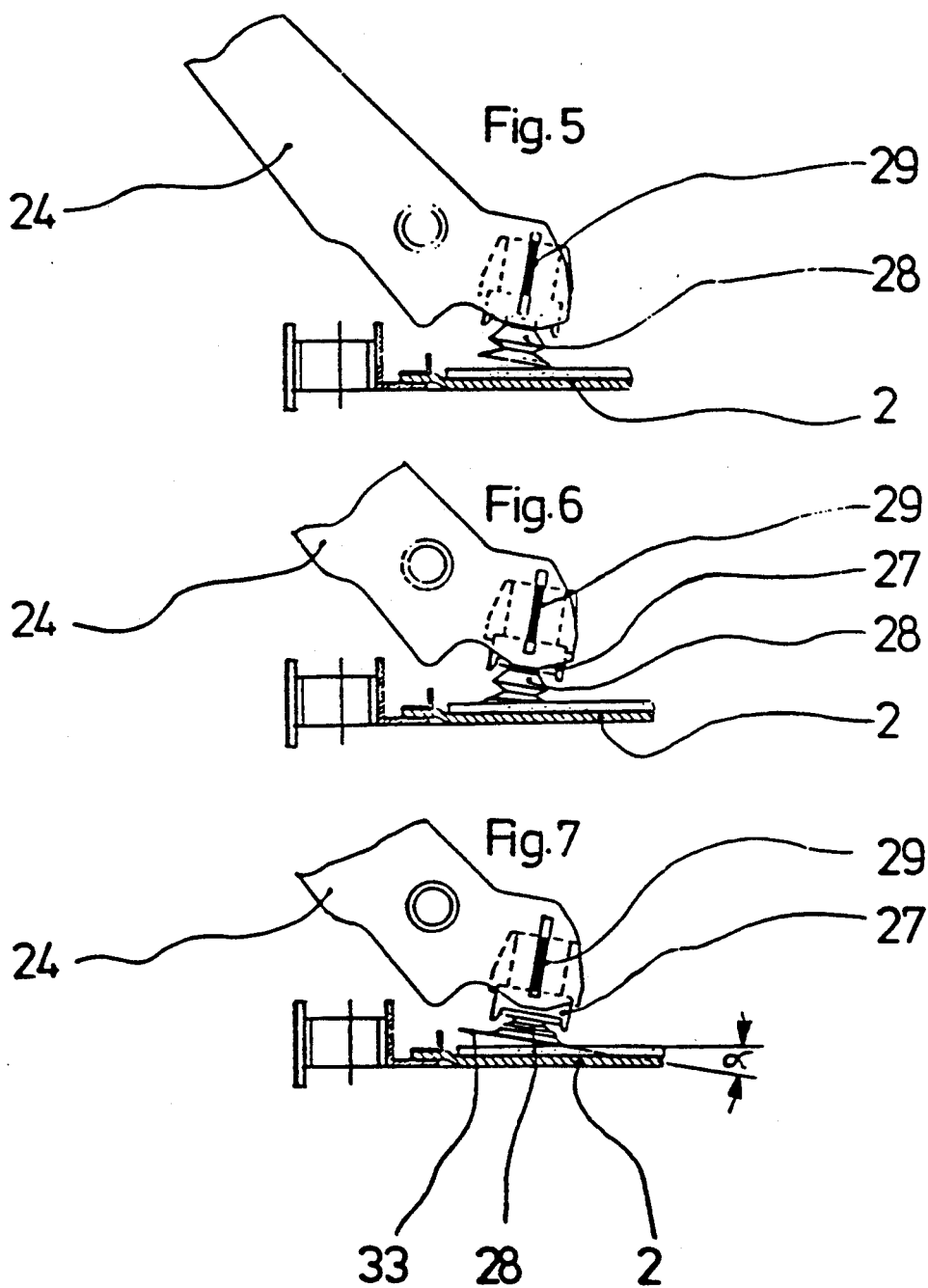

SHEET-REMOVAL DEVICE

TECHNICAL FIELD

The invention relates to a device for removing a sheet from a container, in particular a sheet film from a cassette, said device comprising a novel suction device and mounting for the suction device. The suction device bends off towards the plane of the sheet the section of the sheet which it engages in order to release the sheet to be removed.

BACKGROUND ART

The use of suction to remove film from a cassette is known. See, for example, DE-OS 30 00 760 Offenlegungstag July 16, 1981. In that apparatus, a suction device is lowered by means of a pneumatic control such that the sheet-film section engaged by the suction device is separated from the sheet-film stack located below. The sheet film thus separated is then lifted from the sheet stack and transported to the intended depositing location. The separation of the sheet film and the transport of the sheet film are controlled by means of complex cam-controlled linkages and by pneumatically actuated means. See also EPA 0110649 published June 13, 1984 relating to a copier.

DISCLOSURE OF THE INVENTION

The present invention provides a much simpler and very reliable apparatus using suction. In accordance with the invention the suction device comprises a suction element guided in a rectilinear movement at an angle with respect to the plane of the sheet and having at least one flexible suction member. According to a useful modification of the invention, the suction element is arranged at the free end of a reciprocating crank drive movable into an open cassette. According to a further useful modification of the invention, an arm supporting the suction element has a cam-shaped contour resting against a stationary, rotatable roller and controlling the movement of the suction element. Advantageously the suction element according to the invention is designed as a suction bar having one or several suction members and comprising in its two end sections web-shaped projections which positively engage a slot guide. The slot guide for the suction bar is advantageously arranged at the free ends of parallely disposed arms which are mounted to a shaft movable by a crank arm.

BRIEF DESCRIPTION OF THE DRAWINGS

Further features and advantages can be inferred from the description of embodiments of the invention illustrated in the drawings and from the subclaims. In the schematic drawings.

FIGS. 5-7 are details of the device according to FIG. 2, with a stepwise presentation of the sheet-film releasing operation;

MODES OF CARRYING OUT THE INVENTION

Figure 1:
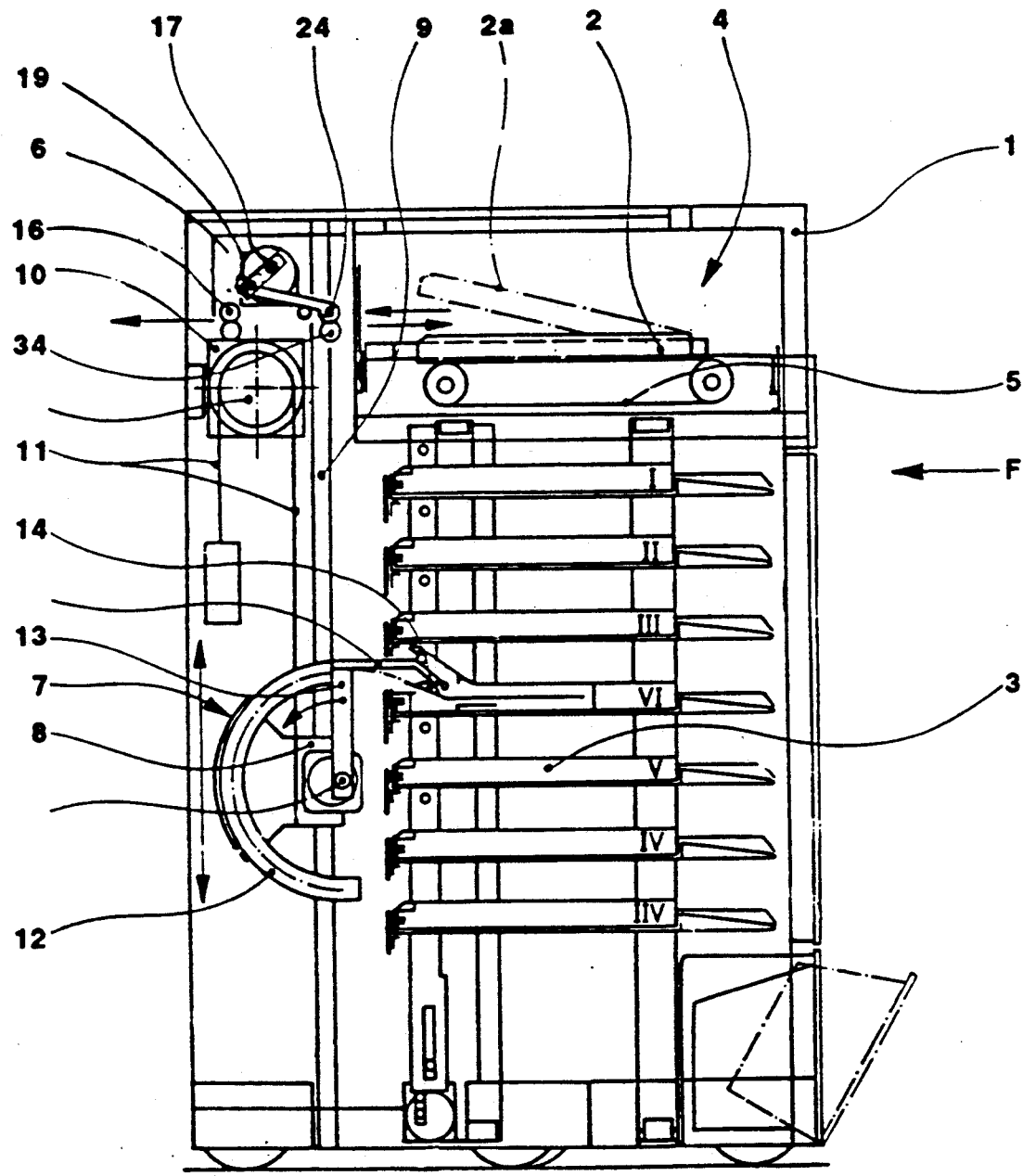
FIG. 1 is a lateral sectional view of the device.

The subject matter of the invention will be described with reference to a device 1 for unloading and reloading X-ray film cassettes 2. The device comprises a light-tight housing 1 in which a plurality of supply magazines 3 are arranged one on top of the other. Each of the supply magazines contains a different sheet-film size. Above the supply magazines 3, a light-tight cassette unloading and reloading station 4 is arranged in which a cassette 2 is located on a transport belt 5 so as to be movable into and out of the station.

Figure 2:
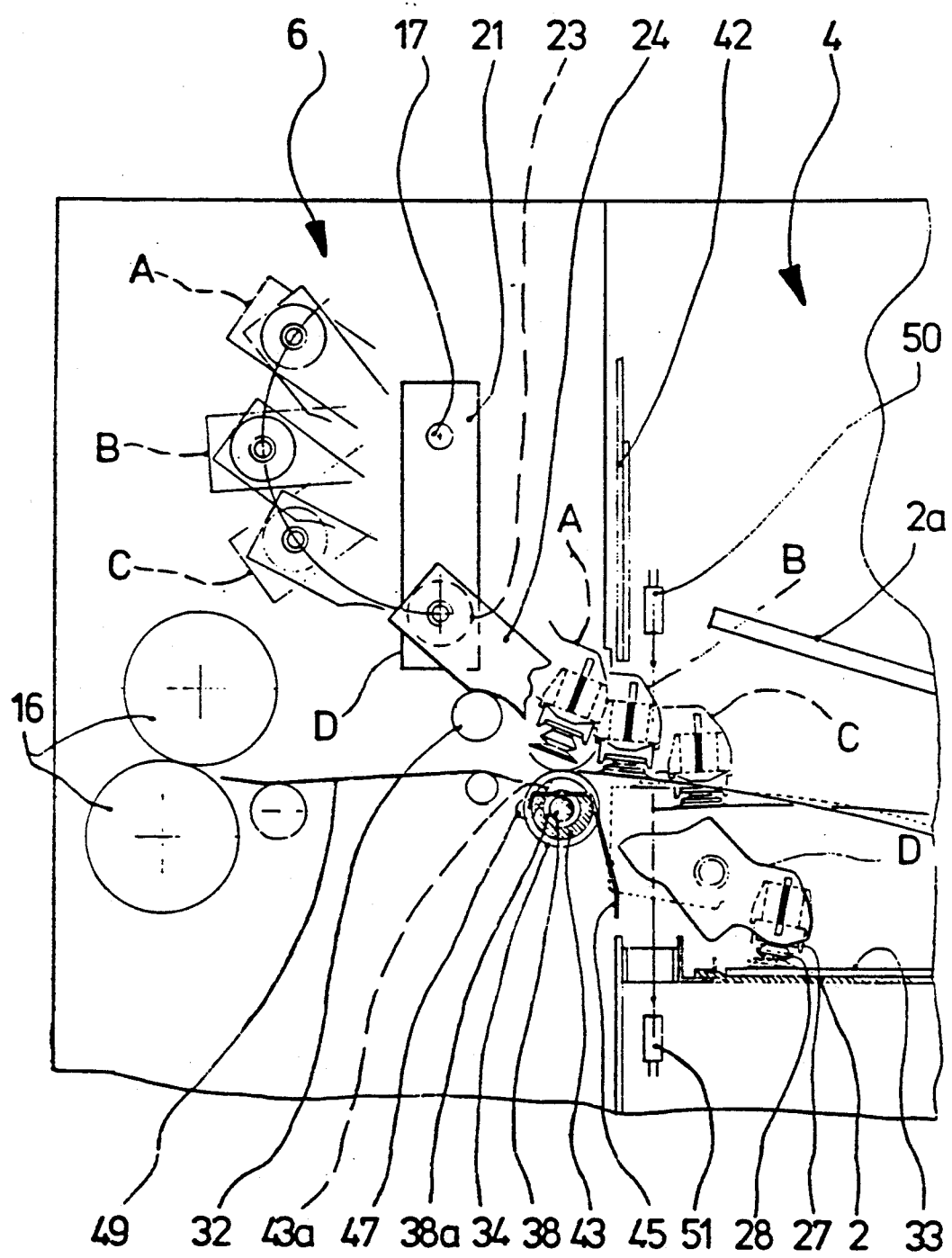
FIG. 2 is a partial view of the device according to FIG. 1 illustrating the individual operating steps.

Opening means of a known type (for example a suction device engaging the upper portion of the cassette), not illustrated in detail, are situated in the unloading and reloading station 4 for operating the cassette cover 2a. The unloading and reloading station 4 is closable at its entrance and exit sides by doors 42 not illustrated in detail (FIG. 2 showing only one door). A device 6 for removal of a sheet film from the cassette 2 is located adjacent to the unloading and reloading station 4 and will be described in more detail in the following.

The end sides of the supply magazines 3 are associated with a sheet-transfer device 7 which can be vertically moved between the supply magazines 3 and the unloading and reloading station 4. The sheet-film transfer device 7 comprises a guide portion 8 by means of which said sheet-film transfer device is guided for shiftable movement along a guide column 9 and vertically movable via a chain 11 driven by a motor 10. The sheet-film transfer device 7 comprises two parallely arranged, substantially semicircular guide channels 12 and a suction arm 13 arranged between said channels, said parts forming together with guide portion 8 a jointly movable assembly group 7. The semicircular guide channels 12 are formed by a sheet-film holder 15 which consists of two identically shaped, parallely arranged wire sections (see FIG. 8).

Suction arm 13 comprises at its free end a suction bar with a plurality of suction members 14 which are movable into a supply magazine 3 to engage a sheet film 33 and draw said sheet film into the guide channels 12.

The sheet film drawn into the guide channels 12 and still held by the suction members 14 is moved by an upward movement of the sheet-film transfer device 7 to the unloading and reloading station 4 where it is shifted into the open cassette 2 (see dash-dotted arrow in FIG. 8) by clockwise movement of the suction arm 13. After having been closed, cassette 2 is fed out of the apparatus by means of transport belt 5 in opposition to the direction of the arrow "F".

For unloading a cassette 2 containing an exposed sheet film, cassette 2 is fed into the apparatus in the direction of the arrow "F", moved by transport belt 5 up to an end abutment and then opened. Subsequently the sheet-film removal device 6 is put in operation, which will be described in the following:

A shaft 17 rotatably mounted in a frame 20 (see FIG. 3) is rotatable in both directions by a motor 19 via a shock-absorbing coupling 18. The shaft 17 is rigidly connected to a crank arm 21 at the free end of which a shaft 22 is rotatably mounted in ball bearings 23. Two suction arms 24 and 25 respectively are rigidly connected with the two ends of shaft 22 and additionally connected with each other by a spacing pin 26 for stabilization. At the free end of suction arms 24, 25, a suction bar 27 with suction members 28 is mounted.

Figure 3:
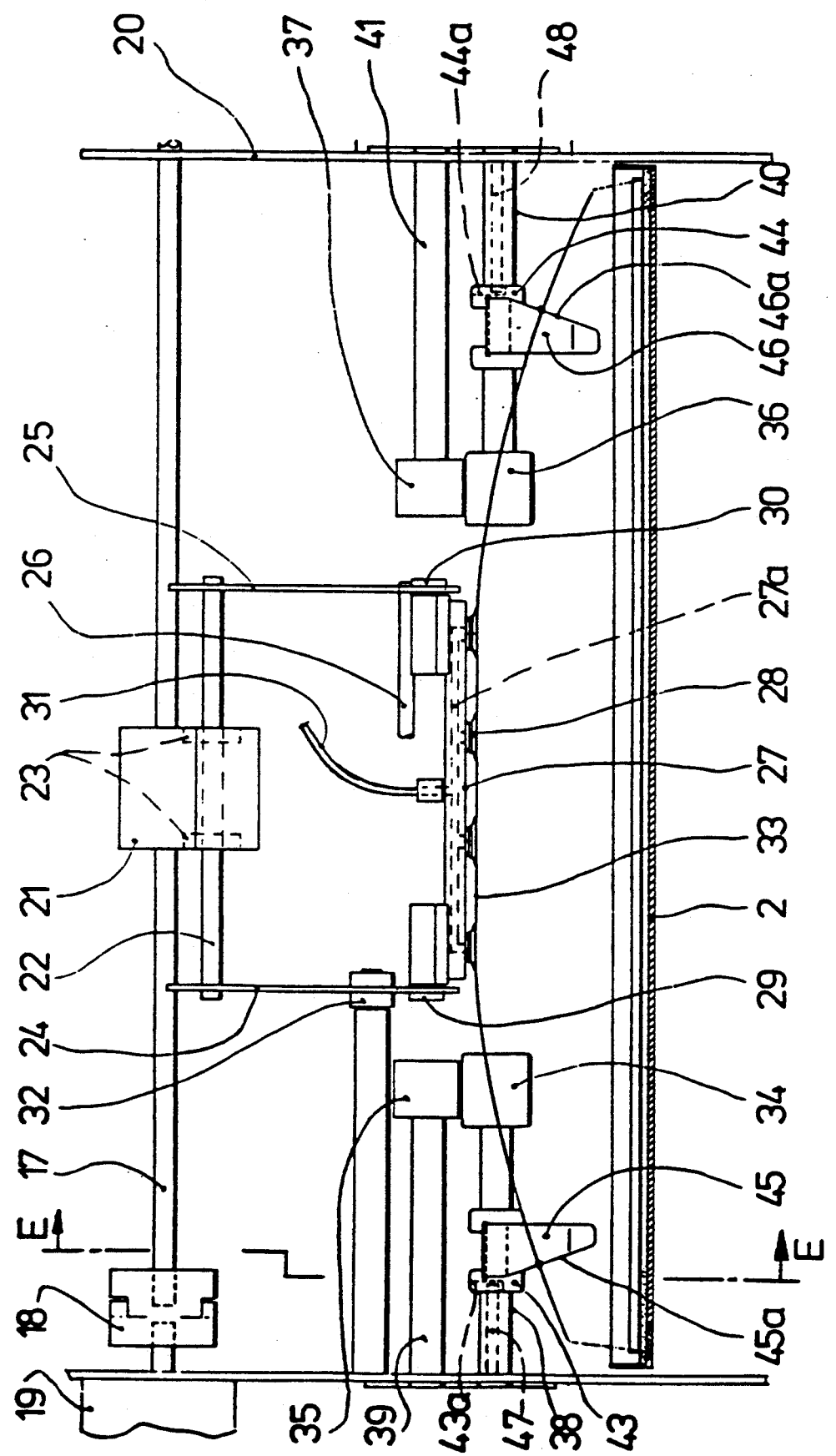
FIG. 3 is a front view of the device according to FIG. 2.
Figure 4:
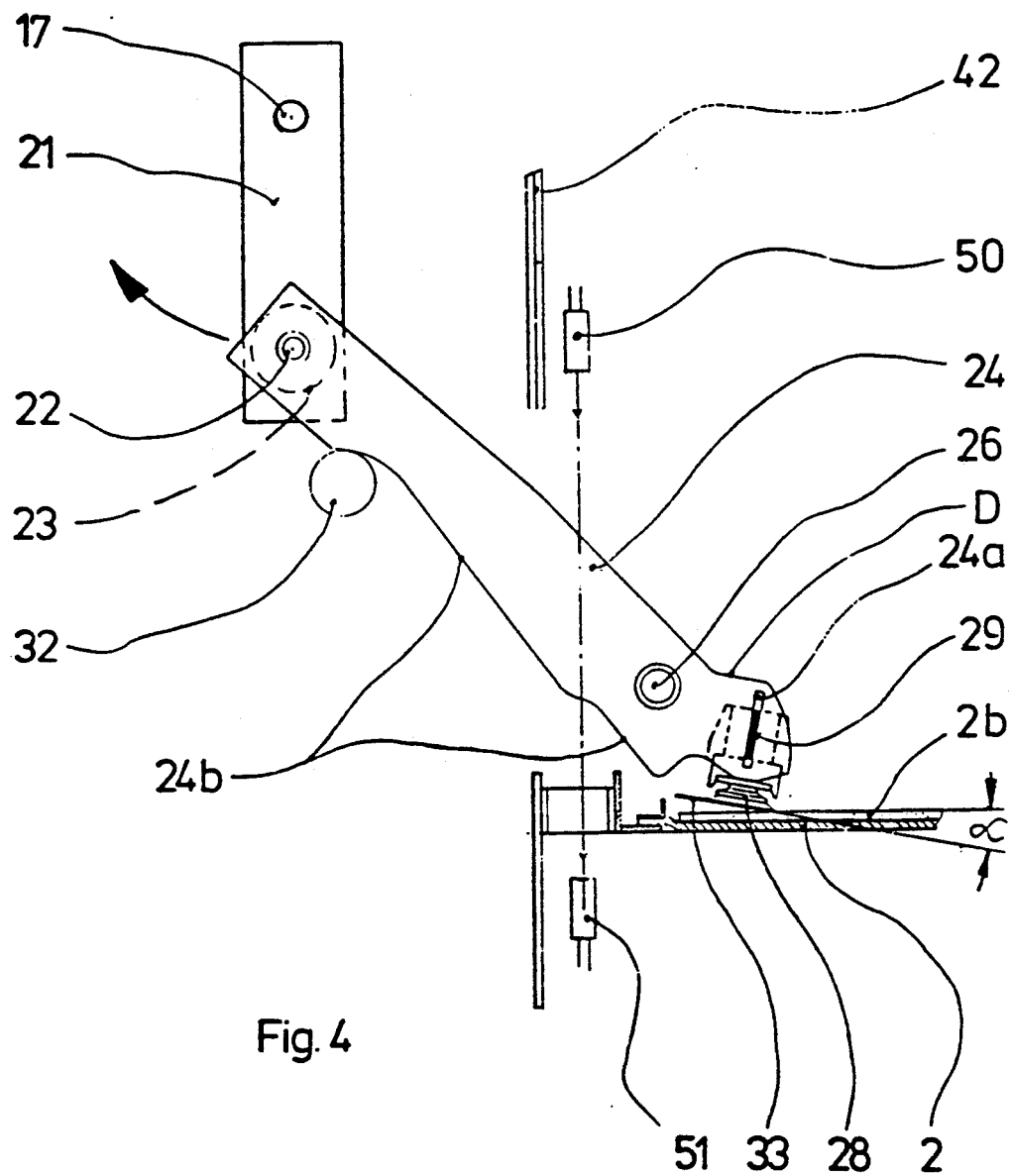
FIG. 4 is an enlarged detail of the device according to FIG. 2 at the moment at which the sheet film is seized.

The suction bar 27 comprises at its two ends straight guide webs 29, 30 which positively engage slot guides 24a of the suction arms 24, 25, (FIGS. 3 and 4). The slot guides 24a (a corresponding slot guide is also provided in suction arm 25) are longer than the guide webs 29, 30 so that suction bar 27 can carry out a compensating movement relative to arms 24 and 25, as will be described further below.

Moreover, the guide webs 29, 30 and suction bar 27 are so dimensioned axially of bar 27 with respect to suction arms 24, 25 of the suction bar 27, that suction bar 27 is movable to and fro in its longitudinal direction within predefined limits. Suction bar 27 is connected to a hose 31 which is connected to a vacuum pump of a known type not illustrated. Hose 31 is connected via air ducts 27a with the suction members 28. Suction arm 24 is provided at its lower longitudinal edge with a cam-shaped contour 24b as shown in FIG. 4 by which it rests against a stationarily mounted, rotatable roller 32.

The suction members 28 are short and provided with only a few folding elements so that they form a stable unit with the suction bar 27 during suctioning in spite of their elastic nature in the relaxed state. This ensures that the actual suctioning operation occurs promptly and reliably.

As can be understood in particular from FIGS. 4 to 8, suction bar 27 and suction members 28 are inclined in their lower position "D" (FIG. 4) such that the suction surface of the suction members 28 and the total suction system 27 and 28 are arranged at an acute angle "α" with respect to the support surface of cassette 2 (sheet-film plane).

This inclined position of suction bar 27—as shown in particular in FIG. 4—is determined by the contact of the corresponding cam-section 24b of suction arm 24 with roller 32 and the inclined arrangement of the slot guides 24a on the suction arms 24 and 25. The inclined position of suction bar 27 and thus of the suction members 28 serves to release a sheet film 33 from the cassette support surface, to which it adheres, in that its section seized by the suction members 28 is bent off so that it can be more easily removed.

A sheet-film removal device 6 serves in a manner to be described further below for removal of an exposed sheet film 33 from cassette 2 and the transfer of said sheet film to pairs of transport rollers 34, 35 and 36, 37 respectively which take over the subsequent transport of the film. The pairs of transport rollers 34, 35 and 36, 37 respectively are driven by motors not illustrated via stationarily mounted drive shafts 38, 39 and 40, 41, respectively.

Holders 43 and 44 to which guide plates 45 and 46 are secured are pivotabably mounted on the lower drive shafts 38 and 40, said guide plates ensuring—as illustrated in FIG. 3—that the sagging lateral sections of a large-format sheet film 33 are shifted onto the transport rollers 34, 35 and 36, 37 respectively. To facilitate such shifting advance onto the rollers, the guide plates 45, 46 have bevelled sections 45a and 46a respectively on their outer edges. For fixing the guide plates 45, 46 in position, the drive shafts 38 and 40 are provided with recesses 38a (shown in FIG. 2 only) which positively receive the guide plates 45, 46 secured to the holders 43, 44.

Figure 8:
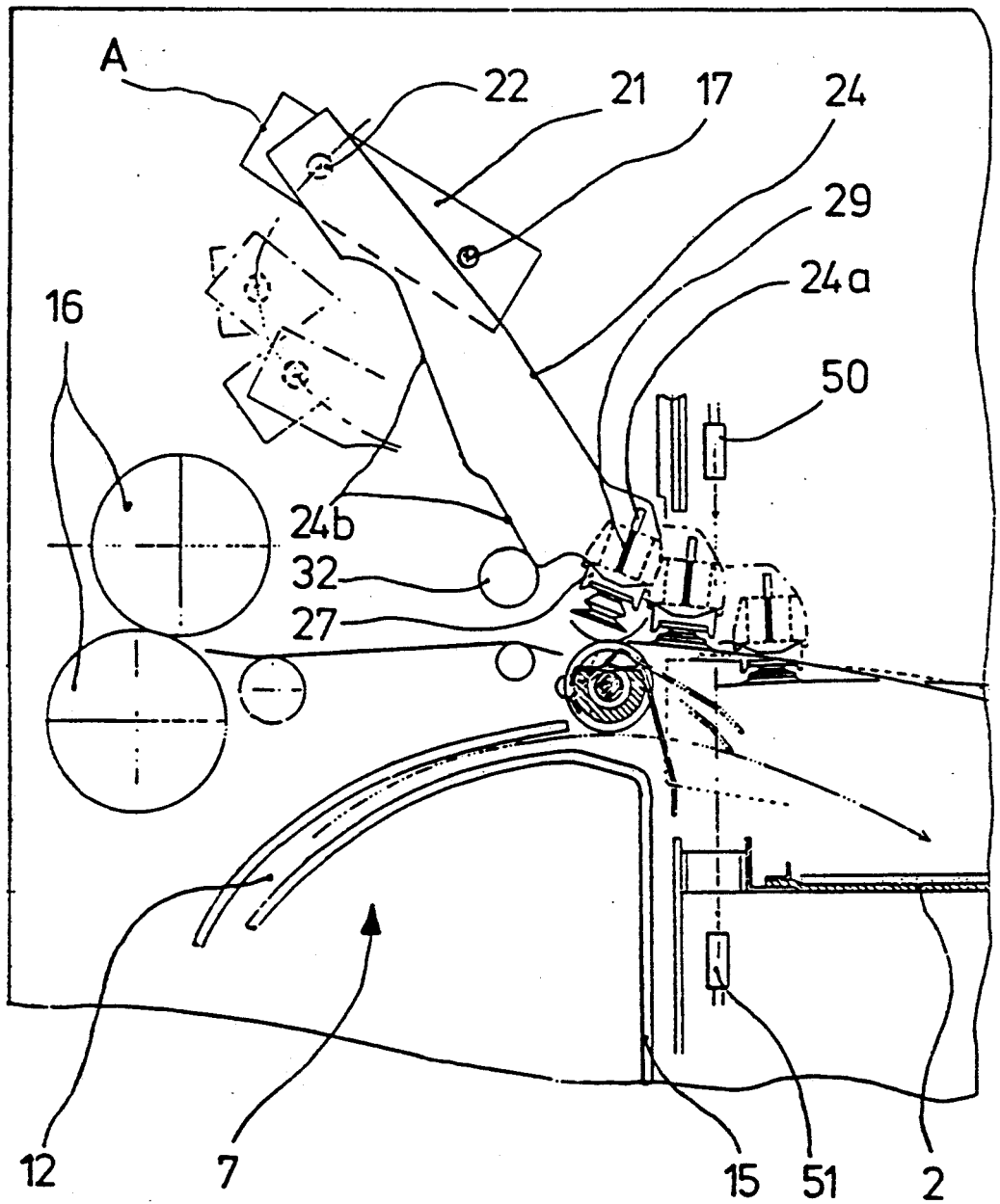
FIG. 8 shows the device according to FIG. 2 at the moment of the sheet-film loading operation.

The path of pivotal movement of the guide plates 45 and 46 is limited by stationary abutments 47, 48 engaging abutment surfaces 43a and 44a respectively (see FIGS. 2 and 3) of the holders 43 and 44 respectively. In one abutment position (see in particular FIG. 2) the guide plates 45, 46 are fixed in their functionally correct shifting position as determined by their own weight whereas the other abutment position, which is shown in FIG. 8 prevents them from swinging upwardly in an uncontrolled manner.

The pairs of transport rollers 34, 35 and 36, 37, respectively, are associated with guide means 49 (FIG. 2) and transport rollers 16 which feed the sheet film 33 after its removal downstream to a light-tight film-developing apparatus of a known type not illustrated.

In the transport path of the sheet film 33 seized by suction bar 27, an infrared-light barrier device 50, 51 controls the suction to suction bar 27 at the proper time before the sheet film 33 is seized by the transport rollers 34 to 36.

The sheet-film removal device 6 functions as follows:

Starting from the initial position "A" shown in FIGS. 8 and 2, the removal device 6 is moved into the unloading and reloading station 4 and into the open cassette 2, 2a via the intermediate positions "B" and "C" shown in particular in FIG. 2. By further rotation of shaft 17, suction bar 27 is then lowered from position "C", in which the suction bar 27 already extends into the open cassette 2, 2a, to position "D" on the sheet film 33 to be removed. FIGS. 5 to 7 illustrate how the sheet-film-releasing operation occurs in detail in position "D" of the removal device 6, FIG. 5 showing the moment at which suction members 28 contact with their lower edges the sheet film 33 in cassette 2.

Due to the small size of the suction members 28 it is ensured that this release operation occurs promptly and reliably and cannot be compensated by excessive flexibility within the contracted suction members. The contraction of the suction members 28 is followed by the suction bar 28 under the influence of its own weight, the suction bar sliding downwardly in its guide 24a, 29 and 30 (see FIG. 7).

After sheet film 33 has been released from the support surface of cassette 2 by bending off of its front section, it can be easily removed from cassette 2. The sheet film is removed starting from the removal position "D" illustrated in FIGS. 4 and 7 in that shaft 17 is now driven clockwise.

During that operation crank arm 21 pulls the suction arms 24, 25 upwardly so that suction bar 27 is lifted from position "D" to position "C" as shown in FIG. 2. Subsequently, suction bar 27 is moved out of cassette 2 and to a position between the pairs of transport rollers 34, 35 and 36, 37, respectively. During such movement of suction bar 27, the front edge of the sheet film 33 thus seized arrives between the light barrier device 50, 51 and interrupts the ray path, which triggers a timing device of a known type, not illustrated, which, after a predetermined interval, switches off the vacuum of the suction members 28 and ventilates said members. The period required for the release of the sheet film by the suction members 28 is selected such that the suction members 28 have been inactivated when the sheet film 33 removed from the cassette is engaged by the pairs of transport rollers 34, 35 and 36, 37 respectively.

After ventilation, the suction members 28 are lifted off the sheet film 33 removed from the cassette in that the suction bar 27 is lifted from position "B" to position "A" by further rotation of shaft 17. The sheet film 33 is fed by the transport rollers 34 to 37 via guide means 49 towards the transport rollers 16 which then advance the sheet film 33 to the film developing apparatus connected to them.

After the sheet film has been completely removed, the sheet-film removal device 6 remains in its initial position "A". Subsequently the empty cassette 2 is loaded with another sheet film. In response to the size of the unloaded cassette 2, a new sheet film is supplied from the supply magazine 3 accommodating to the film size concerned, said film being transported upwardly for this purpose to the cassette unloading and reloading station 4 by the sheet-film transfer device 7.

In FIG. 8 the sheet-film transfer device 7 is shown in its upper position in which the new sheet film is shifted by suction arm 13, which is shown only in FIG. 1, in the direction of the dash-dotted arrow into the open, empty cassette 2. During such shifting movement the front edge of the new sheet film—if broad enough—abuts the guide plates 45, 46 freely movable in this direction and pivots them upwardly out of the range of movement of the sheet film. The impact produced by the arriving sheet film may cause the guide plates 45, 46 to swing upwardly. However as mentioned before, the abutments 47, 48 prevent any uncontrolled movement.

After the sheet film has been completely shifted into cassette 2 and the suction members 14 have been ventilated, suction arm 13 is returned into the sheet-film transfer device 7. The loaded cassette 2 is then closed and dispensed from the apparatus 1 via transport belt 5.

As mentioned before, suction bar 27 is freely movable within predefined limits both in the suction direction and in its longitudinal direction. This movable mounting of suction bar 27 serves to compensate for differences in the cassette types used and/or in the corresponding position of the sheet film to be removed.

Figure 9:
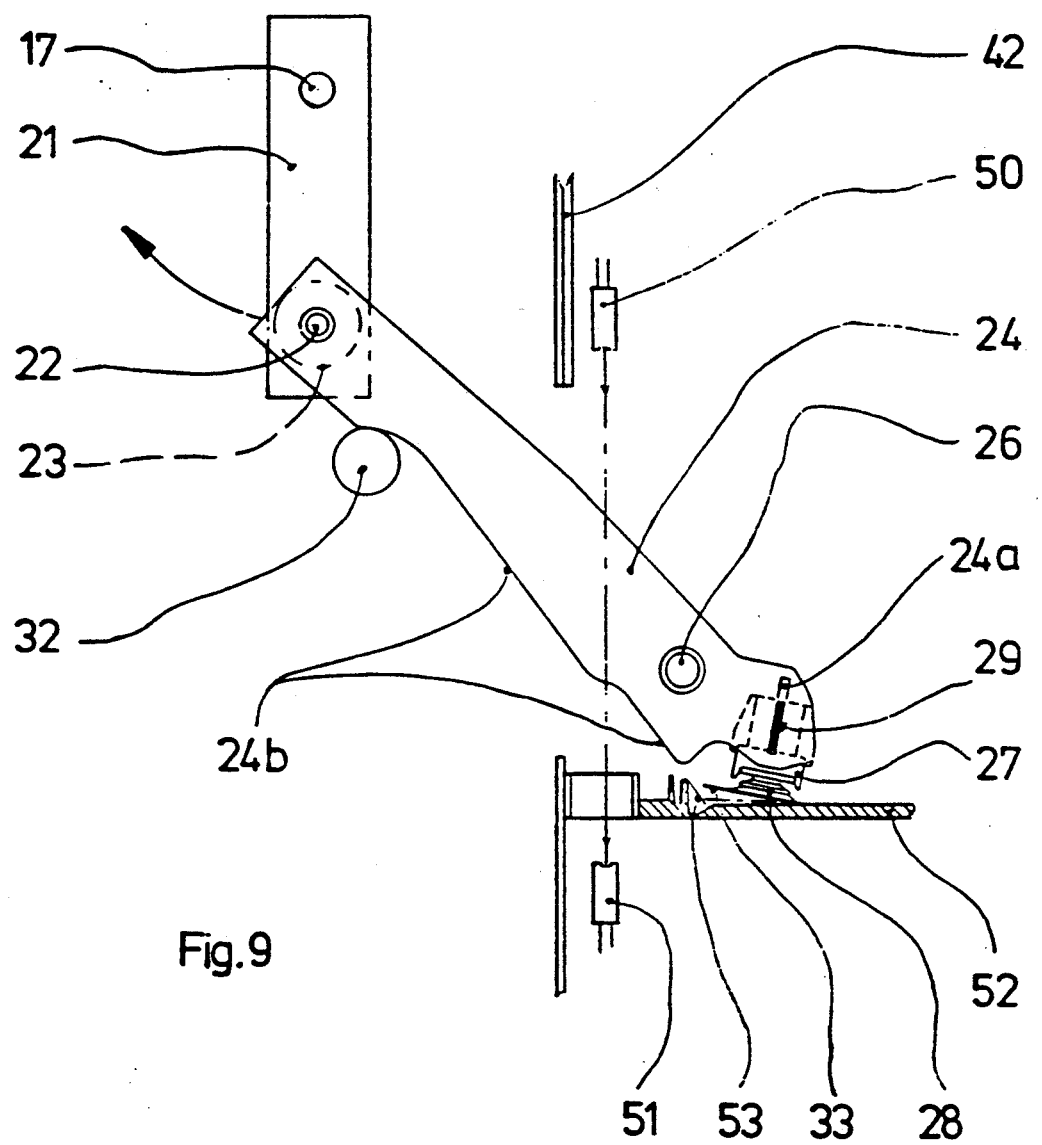
FIG. 9 shows a second embodiment using a different cassette.

In the case of cassette 2 described herein, sheet film 33 rests flatly on an intensifying screen 2b. In another cassette 52, illustrated in FIG. 9, the sheet film 33 rests directly on the inner surface of cassette 52 which is lower than the upper surface of screen 2b in cassette 2. In the front section of cassette 52, two resilient guide elements 53 are distributed across the width of the cassette, said sheets positioning a loaded sheet film 33 against the cassette wall located opposite to the sheets 53. Due to the guide elements 53 which extend into the interior of the cassette, the sheet film 33 assumes a slightly inclined position in the area of the guide sheets 53—FIG. 9—while resting on the inner surface of cassette 53 in other areas. This differing position of sheet film 33 as well as the different height of the cassette 53 is compensated for by the movable mounting of suction bar 27 without the functioning of the device being impaired thereby. The guide sheets 53 are deflected laterally when the cassette 52 is closed so that the sheet film 33 is also in a plane position when cassette 52 is closed.

The invention has been described with reference to a preferred embodiment. However, it will be appreciated that variations and modifications can be effected within the ordinary skill in the art without departing from the scope of the invention.

We claim:

1. In a device for removing a sheet from a container by means of suction means that engages the sheet to bend off a portion of the sheet, the improvement comprising:
    crank means having spaced arms,
    an elongated member extending between and carried by said spaced arms,
    suction means carried by said elongated member,
    slot and guide web means carried by said spaced arms and comprising straight slot means in end portions of said spaced arms and guide web means in the ends of said elongated member, which guide web means engage said slot means to provide limited, free, rectilinear movement of said elongated member and suction means with respect to said spaced arms, and
    means for moving said crank means to move said spaced arms in an arcuate path in a first direction to move said suction means toward said sheet to a position in which said suction means is proximate said sheet, at which position said straight slot means is positioned at an acute angle to the sheet and said suction means engages the sheet at an acute angle, and in a second direction to lift the engaged sheet,
    said slot and guide web means providing for rectilinear compensating movement of said suction means in one rectilinear direction relative to said spaced arms as said suction means engages the sheet, and rectilinear movement in a direction opposite to one direction when said spaced arms move in said second direction to lift the sheet.

2. The improvement set forth in claim 1, further comprising:
    said crank means including a pivoted and driven crank arm pivotally attached to said spaced arms for moving said spaced arms in said arcuate path into and out of the container, said slot means being at the ends of said spaced arms remote from their attachment to said crank arm,
    one of said spaced arms having a cam-shaped contour on its lower edge cooperating with a stationary roller, whereby pivoting of said crank arm in one direction causes movement of said suction means into the container, followed by movement of said suction means downwardly to contact a sheet, and pivoting of said crank arm in the opposite direction causes lifting of said suction means followed by movement of said suction means out of the container.

* * * * *